United States Patent
Ng et al.

(10) Patent No.: US 8,722,216 B2
(45) Date of Patent: May 13, 2014

(54) CATHODE DESIGN

(75) Inventors: How Yong Ng, Singapore (SG); Olivier Patrick Lefebvre, Singapore (SG); Wai Keong Ooi, Singapore (SG)

(73) Assignee: National University of Singapore, Singapore (SG)

(*) Notice: Subject to any disclaimer, the term of this patent is extended or adjusted under 35 U.S.C. 154(b) by 67 days.

(21) Appl. No.: 13/002,747

(22) PCT Filed: Jul. 8, 2009

(86) PCT No.: PCT/SG2009/000242
§ 371 (c)(1),
(2), (4) Date: Jan. 5, 2011

(87) PCT Pub. No.: WO2010/005397
PCT Pub. Date: Jan. 14, 2010

(65) Prior Publication Data
US 2011/0136021 A1    Jun. 9, 2011

Related U.S. Application Data

(60) Provisional application No. 61/078,834, filed on Jul. 8, 2008.

(30) Foreign Application Priority Data

Jul. 31, 2008  (SG) .................................. 200805779

(51) Int. Cl.
*H01M 8/16*    (2006.01)

(52) U.S. Cl.
USPC ............... 429/2; 429/401; 429/532; 429/534; 204/290.01

(58) Field of Classification Search
USPC .................. 429/2, 401, 532, 534; 204/290.01
See application file for complete search history.

(56) References Cited

U.S. PATENT DOCUMENTS

| | | | |
|---|---|---|---|
| 6,972,162 B2 * | 12/2005 | Gao et al. | 429/532 X |
| 7,709,113 B2 * | 5/2010 | Logan et al. | 429/2 |
| 2008/0213632 A1 | 9/2008 | Noguera et al. | |

FOREIGN PATENT DOCUMENTS

| | | |
|---|---|---|
| CN | 1776950 A | 5/2006 |
| KR | 2003/052789 A | 6/2003 |
| WO | WO 2008/058165 A2 | 5/2008 |

OTHER PUBLICATIONS

International Search Report and Written Opinion mailed Sep. 16, 2009 of corresponding International Application No. PCT/SG2009/000242.

* cited by examiner

*Primary Examiner* — Zachary Best
(74) *Attorney, Agent, or Firm* — Alston & Bird LLP

(57) ABSTRACT

A cathode for a fuel cell comprising a catalyst layer; a backing layer mounted to an aperture in a fuel chamber of said fuel cell; 1) wherein said catalyst layer is mounted to the backing layer on a face opposed to the aperture, so as to be in fluid communication with atmospheric oxygen in the case of microbial fuel cell; and 2) wherein said catalyst layer is mounted to the backing layer on a face opposed to the aperture, so as to be in fluid communication with water in the case of microbial electrolysis cell.

11 Claims, 5 Drawing Sheets

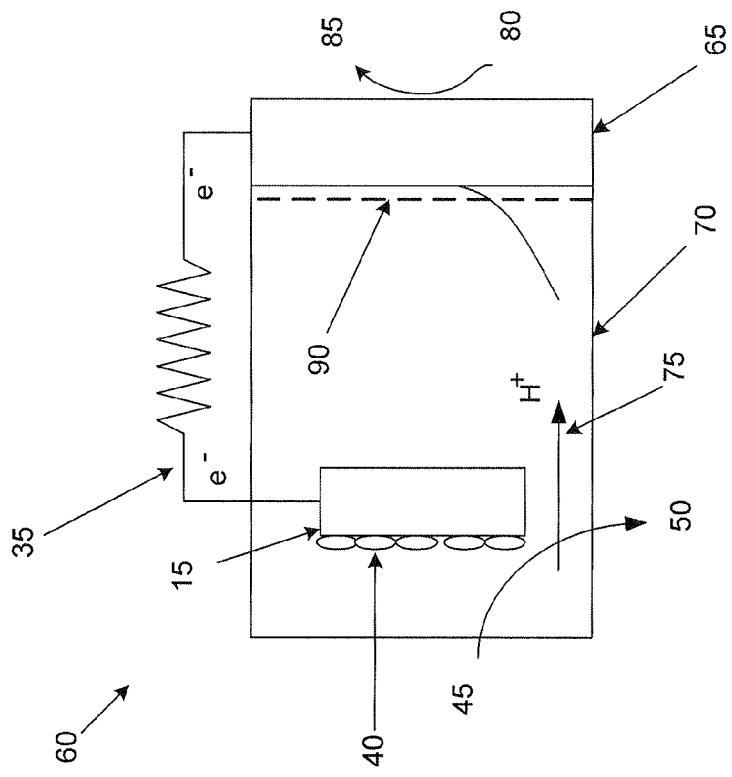
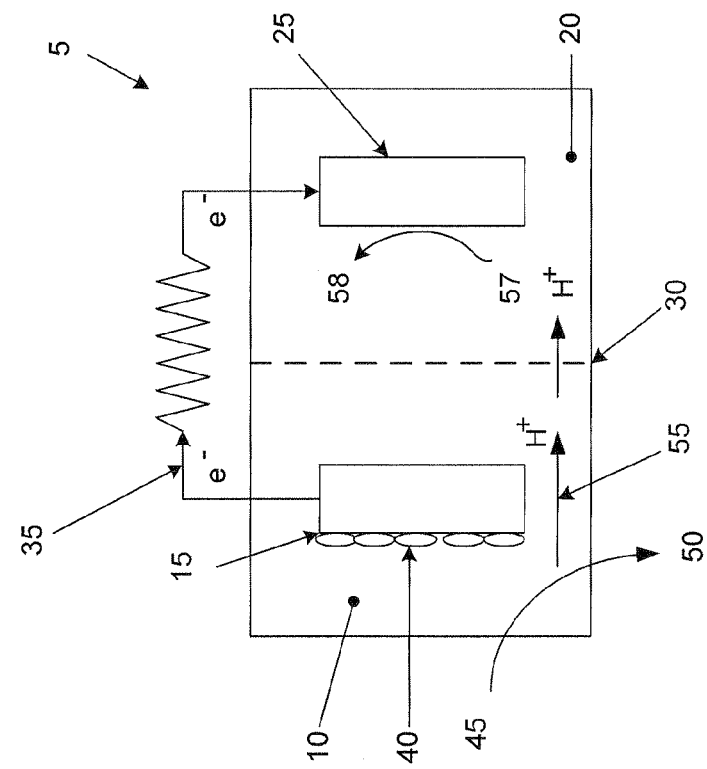
Figure 1A
Figure 1B

CATHODE DESIGN

CROSS REFERENCE TO RELATED APPLICATIONS

This application is a national stage application, filed under 35 U.S.C. §371, of International Application No. PCT/SG2009/000242, filed Jul. 8, 2009, and claims priority to U.S. Provisional Application No. 61/078,834, filed Jul. 8, 2008 and Singapore Application No. 200805779-6, filed Jul. 31, 2008, which are hereby incorporated by reference in their entirety.

FIELD OF THE INVENTION

The present invention relates to the manufacture and use of a fuel cell and having particular application to microbial fuel cells and microbial electrolysis cells. Specifically the invention relates to an arrangement and construction of a cathode for such a fuel cell.

BACKGROUND OF THE INVENTION

Microbial fuel cells (MFCs) have recently been considered as an alternative and promising way for the direct conversion of the biochemical energy bound to wastewater into electricity without any intermediate step.

A MFC is fundamentally an anaerobic process where bacteria grow in the absence of oxygen in a chamber containing an anode and form a biofilm that covers the anode. To generate electricity, bacteria in the anode chamber degrade organic matter (the influent/fuel) and transfer the electrons to the anode. These electrons pass through an external circuit producing current. The digestion of organic matters occurs in anaerobic environment so that the electrons are not consumed by electron acceptors such as oxygen. The transfer of these electrons occurs via bacterial respiratory enzymes. Protons, created at the anode to maintain a charge balance, migrate through the solution to a cathode where they combine with oxygen and the electrons produced at the anode to form water. Hence, the cathode has to be maintained under aerobic conditions.

MFC can be of two types: 1) a two-chambered MFC, where the anode chamber is anaerobic and the cathode chamber is aerobic (FIG. 1A), or 2) a single-chambered MFC where both electrodes are placed in an anaerobic chamber, with one face of the cathode exposed to the air (FIG. 1B). A proton exchange membrane (PEM), aiming at facilitating the transfer of protons, usually separates the anode from the cathode. The potential difference between the respiratory enzyme and oxygen results in electricity generation.

Microbial electrolysis cells (MECs) are, simply put, modified microbial fuel cells (MFCs) designed to produce hydrogen gas at the cathode. Like an MFC, the MEC is composed of one or two chambers containing an anode and a cathode. Bacteria on the anode catalyze the oxidation of organic substrates, producing electrons and protons. The electrons from the metabolic reactions travel through an external circuit towards the cathode. Protons are transferred to the cathode in the aqueous solution. At the cathode, the electrons and protons recombine to form hydrogen gas. To successfully produce hydrogen gas, an external voltage is applied to overcome thermodynamic barrier, as the direct production of hydrogen from the hydrolysis of organic compounds is not thermodynamically feasible. The hydrogen gas produced by MECs is of high purity compared to other biological hydrogen production processes, negates the use of expensive gas purification techniques.

SUMMARY OF THE INVENTION

In a first aspect the invention provides a cathode for a microbial fuel cell comprising a backing layer mounted to an aperture in a fuel chamber of said microbial fuel cell; wherein a catalyst layer is mounted to the backing layer on a face opposed to the aperture, so as to be in fluid communication with atmospheric oxygen.

In one embodiment, the cathode may include a piece of conductive material, such as but not limited to carbon paper, conductive plastic polymers, steel, graphite granules, graphite fibers, reticulated vitreous carbon, or any non-conductive material coated with a conductive paint, on which are applied the catalyst layer.

In a second aspect, the invention provides a method for generating electricity, said method including the steps of: providing a microbial fuel cell (MFC) having a cathode, said cathode including a catalyst layer and a backing layer mounted to an aperture in a fuel chamber of said microbial fuel cell; said catalyst layer mounted to the backing layer on a face opposed to the aperture, so as to be in fluid communication with atmospheric oxygen; providing fuel to an anode of said MFC; generating electrons passing through said anode to an external circuit coupling the anode and cathode; communicating resulting protons to said cathode.

In a third aspect, the invention provides a cathode for a microbial electrolysis cell comprising a catalyst layer, a backing layer mounted to an aperture in a fuel chamber of said microbial electrolysis cell; wherein said catalyst layer is mounted to the backing layer on a face opposed to the aperture, so as to be in fluid communication with either a gas or a water of minimal contaminants.

In one embodiment, the current generated by the MFC may be a function of the activity of the micro-organisms contained in the microbial fuel cell. This may be a measure of the amount of organic matter available in the fuel and/or of the presence of toxic substances in the fuel. To this end a microbial fuel cell may be used as a biosensor to monitor the concentration of organics/toxicants in the fuel.

An MFC according to one aspect of the invention provides a new type of cathode for single-chambered air-cathode MFC wherein the catalyst layer is applied to the side of the cathode exposed to the air on top of a backing layer. The catalyst layer can then be protected by one or more gas diffusion layers. By providing a catalyst layer that is facing the air, the arrangement may become more efficient through closer and better contact with the atmospheric oxygen, leading to better performance. Further, by separating the catalysts from the biomass/influent/fuel, the catalysts remain uncontaminated, and so may also increase performance and functional life of the MFC.

An MEC according to a further aspect of the invention provides a cathode for double-chambered MEC wherein the catalyst layer is applied to the side of the cathode exposed to either a gas (i.e., absolute absence of oxygen) or water of minimal contaminants. By providing a catalyst layer that is facing either a gas (i.e., absolute absence of oxygen) or water having minimal contaminants, the separation of the catalysts from the biomass/influent/fuel, the catalysts remain uncontaminated, and may also increase performance and functional life of the MEC.

The invention provides for an arrangement whereby the carbon cloth and/or backing layer isolates the catalyst layer from contamination by the fuel/biomass within the anode chamber of the microbial fuel cell.

The backing layer provides support for the catalyst layer and allows the diffusion of protons to the catalyst. Such a backing layer may seal an aperture in the anode chamber of the MFC so as to prevent the flow of biomass, such as wastewater from the chamber. The backing layer may also provide mechanical support for the catalyst layer. It may be made of Nafion or polytetrafluoroethylene (PTFE) which may also be mixed with carbon black.

An advantage provided by embodiments of the present invention may include higher electricity generation in the case of the MFC; and higher hydrogen production in the case of MEC.

The influent/fuel may include (i) any biodegradable organics in a solution; (ii) biofuel (defined as a substrate derived from the biomass), (iii) wastewater (low strength, such as domestic wastewater or high strength, such as industrial wastewater), (iv) organic solid waste mixed with liquid (such as wastewater) to become liquid waste, and (v) pretreated forms of items (ii) to (iv).

The present invention may also use any organics dissolved in solution as the influent for the purpose of 1) generating electricity in the case of the MFC, and (2) generating hydrogen in the case of MEC.

For MFC, the extent of electricity thus generated may be used to monitor the presence and/or concentration of toxicants, and concentration of organic matter present in the said solution.

Possible applications of the present invention related to MFC may include (i) wastewater treatment plants, (ii) power plants for electricity generation from any solutions that contain organics (intentionally or unintentionally produced), (iii) any locations where wastewater or waste are generated and required to be treated, (iv) as a biosensor to monitor the concentration of organics in solution, the current generated by the fuel cell being proportional to the concentration of organics, and (v) as a biosensor to monitor the presence and concentration of toxicants in solution, the current generated by the fuel cell being dependent on microbial activity and/or inhibition by toxicants.

In the case of MFC, the gas diffusion layer (GDL) may provide pathways for reaction between atmospheric $O_2$ and water. This GDL may be made of polytetrafluoroethylene (PTFE) mixed with carbon black. Deposition methods may include brushing, air brushing, sputtering. Additional GDLs made of pure PTFE may be added on top of the first GDL.

The catalyst layer is where the reaction takes place. The nature of the catalyst may include Cobalt, Platinum and alloys thereof. Deposition methods may include but are not limited to brushing, air brushing, sputtering.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

FIG. 1A is a schematic of a two chamber microbial fuel cell according to the prior art;

FIG. 1B is a schematic view of a single chamber microbial fuel cell having the catalyst facing the biomass within the chamber, according to the prior art;

DETAILED DESCRIPTION OF VARIOUS EMBODIMENTS OF THE INVENTION

Figure 2A:
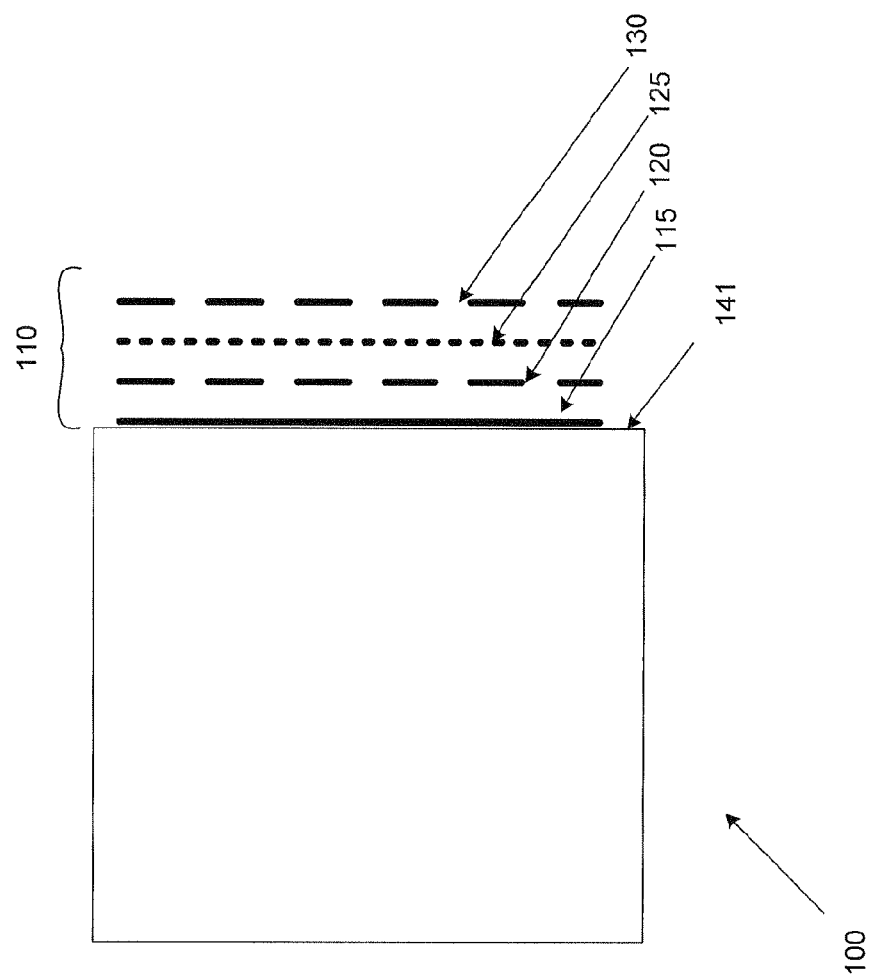
FIG. 2A is a schematic view of a microbial fuel cell according to one embodiment of the present invention.

FIGS. 1A and 1B show different microbial fuel cells (MFC) according to the prior art.

With respect to FIG. 1A, shown is a two chamber MFC 5 having an anode chamber 10 and cathode chamber 20. The anode chamber 10 is characterized by being anaerobic so as to prevent released electrons being consumed by oxygen feeding into the chamber 20. Within the chamber is a supply of biomass, such as wastewater, within the chamber 10. The organic material within the wastewater then forms a biofilm 40 on the anode 15 which on degradation of the influent/fuel 45 produces electrons. The anode 15 is connected to an external circuit 35 through which the consequential current flows to the cathode 25 within the cathode chamber 20. Thus, the fuel 45 supplied to the anode chamber 10 is oxidized 50 producing a flow of protons 55 through a proton exchange membrane (PEM) 30 whereby the protons combine with oxygen 57 within the cathode chamber 20 to form water 58.

FIG. 1B shows an alternative arrangement of an MFC 60 whereby a single chamber 70 exists being the anode chamber 70, again being anaerobic to prevent oxygen entering the chamber. The cathode chamber of FIG. 1A is replaced by an external cathode 65, having a catalyst layer attached to the MFC, and so facing the biomass within the chamber 70. The protons 75 combine at the site of the cathode 65 with atmospheric oxygen 80 to produce water 85. Again a PEM 90 is provided to separate the cathode 65 from the anode chamber 70.

The present invention provides an alternative arrangement of the above single chamber MFC. As shown in FIG. 2A, in one embodiment of the present invention, the cathode 110 includes a sheet of carbon cloth 115 situated at the wastewater/air interface 141 of a single-chambered MFC 100. In the following example, the cathode working surface area equaled 64 $cm^2$. In this case, the carbon cloth acts as a separation layer isolating the catalyst layer from the influent/fuel. Accordingly, the catalyst layer is directed in a direction away from the aperture. For clarity, this will be called an air-facing catalyst, as compared to an influent/fuel, or water, facing catalyst, as shown in FIG. 1B.

In a further aspect, the present invention provides a double chamber microbial electrolysis cell. One embodiment of such a microbial electrolysis cell is provided in FIG. 2B, which shows a two chamber MEC 1000 having an anode chamber 1100 and cathode chamber 1200. The anode chamber 1100 is characterized by being anaerobic. Within the chamber 1100 is a supply of biomass, such as wastewater. The organic material within the wastewater forms a biofilm 1300 on the anode 1400 which on degradation of the influent/fuel 1500 produces electrons. The anode 1400 is connected to an external circuit 1600 through which the consequential current flows to the cathode 1700. An external voltage 1900 is applied to overcome thermodynamic barrier, as the direct production of hydrogen from the hydrolysis of organic compounds is not thermodynamically feasible. Thus, the fuel 1500 supplied to the anode chamber 1100 is oxidized 2000 producing a flow of protons 2100 towards the cathode 1700 to form hydrogen 2200 in the cathode chamber 1200. The medium in the cathode chamber 1200 may be either a gas such as hydrogen or nitrogen in the absolute absence of oxygen or water with minimal contaminants, so as to maintain an uncontaminated catalyst.

Figure 2B:
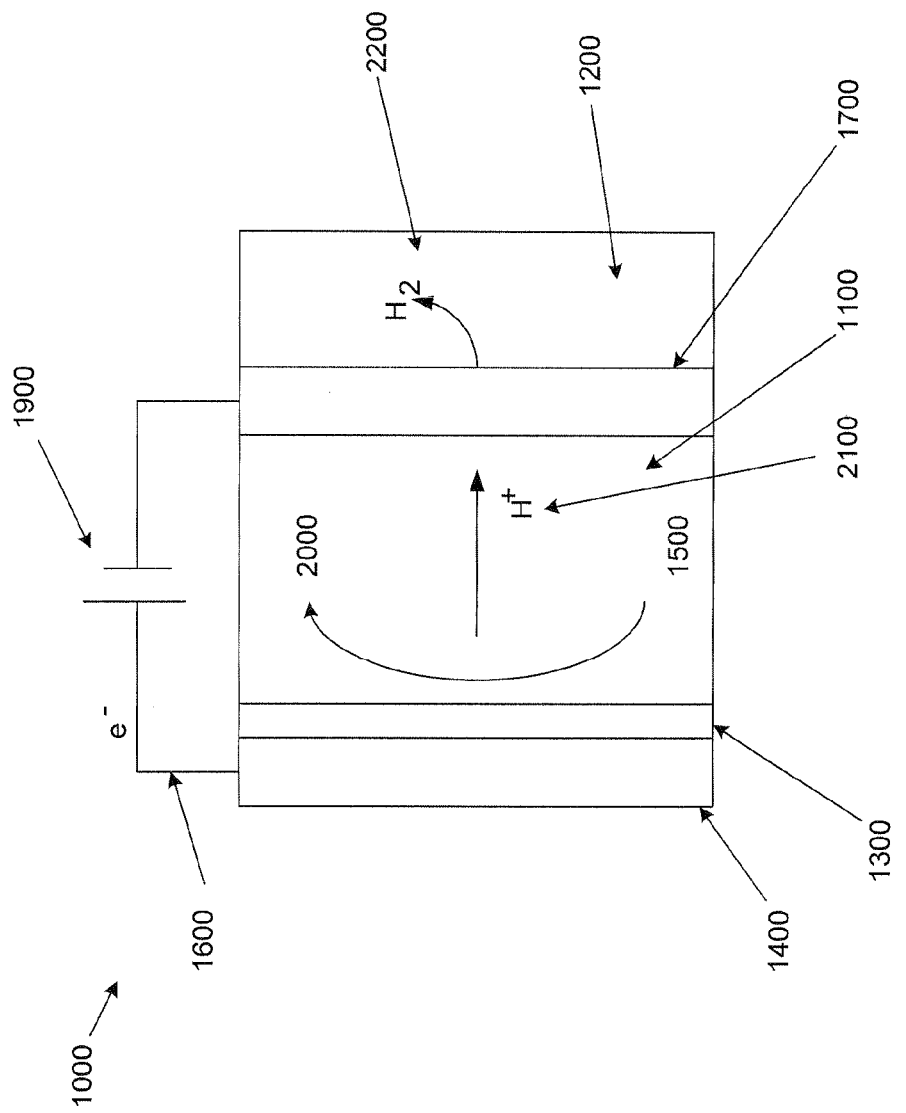
FIG. 2B is a schematic view of a microbial electrolysis cell according to one embodiment of the present invention.

As shown in FIG. 2B, in one embodiment of the present invention for MEC application, the cathode 1700 shall have a similar structure to that of FIG. 2A. In this case, the carbon cloth acts as a separation layer isolating the catalyst layer from the influent/fuel. Accordingly, the catalyst layer is directed in a direction away from the aperture or anode chamber 1100 facing either an inert gas or a water of minimal contaminants in the cathode chamber 1200.

The fabrication of a cathode 110 or 1700 similar to that shown in FIGS. 2A and 2B may include the following successive steps:

Teflonization by soaking carbon cloth 115 in 30 wt % PTFE suspension in water. The carbon cloth 115 is dried in oven at 100° C. and then weighed to determine the Teflon content 115 so as to achieve a target 115 in the range of 15-20 wt %. The teflonized carbon cloth 115 is then transferred to an oven and heated to 350° C. at 4.5° C./min to gradually remove the dispersant agent present in PTFE and to melt the PTFE particles at 350° C. for 30 minutes.

Next is provided an application of a backing Layer (BL) 120 made of Nafion and carbon black (VXC72-R) and Nafion particles. The weight ratio of the carbon black to Nafion is 2:1. Carbon black is mixed with distilled water and ethanol (1:1 v/v). Nafion solution (5%) is added to the carbon black ink and stirred to make a homogeneous dispersion. The mixture is ultrasonicated for 30 min. The diffusion ink is applied to one side of the carbon cloth 115 using an air brush. The gas diffusion electrodes are baked in oven at 130° C. for 30 min. Typical loading of the diffusion ink is around 3.6 mg/cm$^2$.

Application of the catalyst layer 125 includes Cobalt being applied at a load of 0.1 mg cm$^2$ by sputter-deposition using a Denton Vacuum Discovery TM 18 Deposition System.

In the case of an MFC, application of a GDL 130 made of PTFE on top of the catalyst layer 125. The GDL 130 for the electrodes comprises carbon black (VXC72-R) and PTFE particles. The weight ratio of the carbon black to PTFE is 3:2. The carbon black is treated in an ultrasonicator in a mixture of distilled water and ethanol (1:2 vol. ratio) and the PTFE is stirred in distilled water. The PTFE solution is added to the carbon black ink and the mixture is ultrasonicated for 30 min. The diffusion ink is applied to one side of the carbon electrode using an air brush. Typical loading of the diffusion ink is around 3.6 mg/cm$^2$. The gas diffusion electrode is dried in oven at 100° C. The gas diffusion electrode is sintered at 350° C. under the same conditions as the heat treatment of the Teflonized carbon electrodes. The sheet of carbon cloth is then ready to be incorporated in a single-chambered MFC for test.

The MFC 100 used for tests and illustrated in FIG. 2A, had dimensions 120×120×30 mm and the working volume of the MFC 100 was 85 mL. It was incorporated with channels that provided a serpentine pathway for the wastewater. The flow channels were sandwiched between a sheet of anode and a sheet of cathode and the distance between the anode and cathode was set to 2 cm. Anode and cathode surface areas were similar and each equaled 64 cm$^2$. The anode was made of non-wet-proofed plain carbon cloth and was applied against a piece of acrylic to ensure anaerobic conditions.

Inoculation was done using bacteria naturally present in domestic wastewater. This inoculation step was performed in a batch-mode, the MFC being refilled with fresh domestic wastewater when the voltage dropped below 50 mV. The inoculation step was considered achieved when the profiles of voltage generation showed similar pattern for at least three consecutive batches. The MFC 100 operation was then switched to continuous mode using sodium acetate as substrate. Sodium acetate was pumped continuously using a peristaltic pump at a flow rate of 0.3 mL min$^{-1}$ into the bottom of the MFC and was allowed to flow through channels directly between an anode and a cathode in an upflow mode. The loading rate was 16 Kg acetate m$^{-3}$ d$^{-1}$ and the hydraulic retention time equaled 4.7 hrs.

Figure 3:
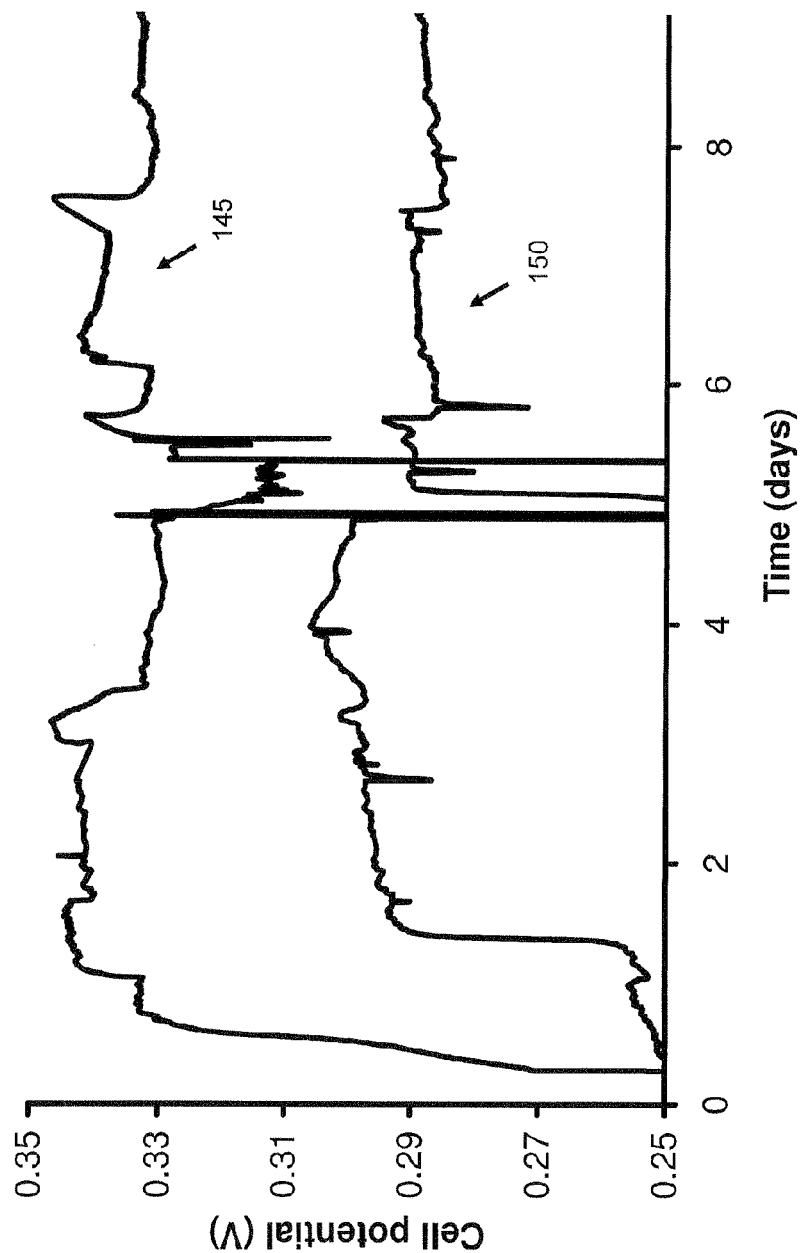
FIG. 3 is a graphical representation of the performance of a microbial fuel cell according to the present invention as compared to the prior art.

Comparison of performance obtained with the new type of cathode 145 and with a conventional cathode 150 built in the same way except that the catalyst layer faces the wastewater is displayed in FIG. 3. Cell potential is in average higher with the present invention by 40 mV (i.e. an increase of ≈15%)

Figure 4:
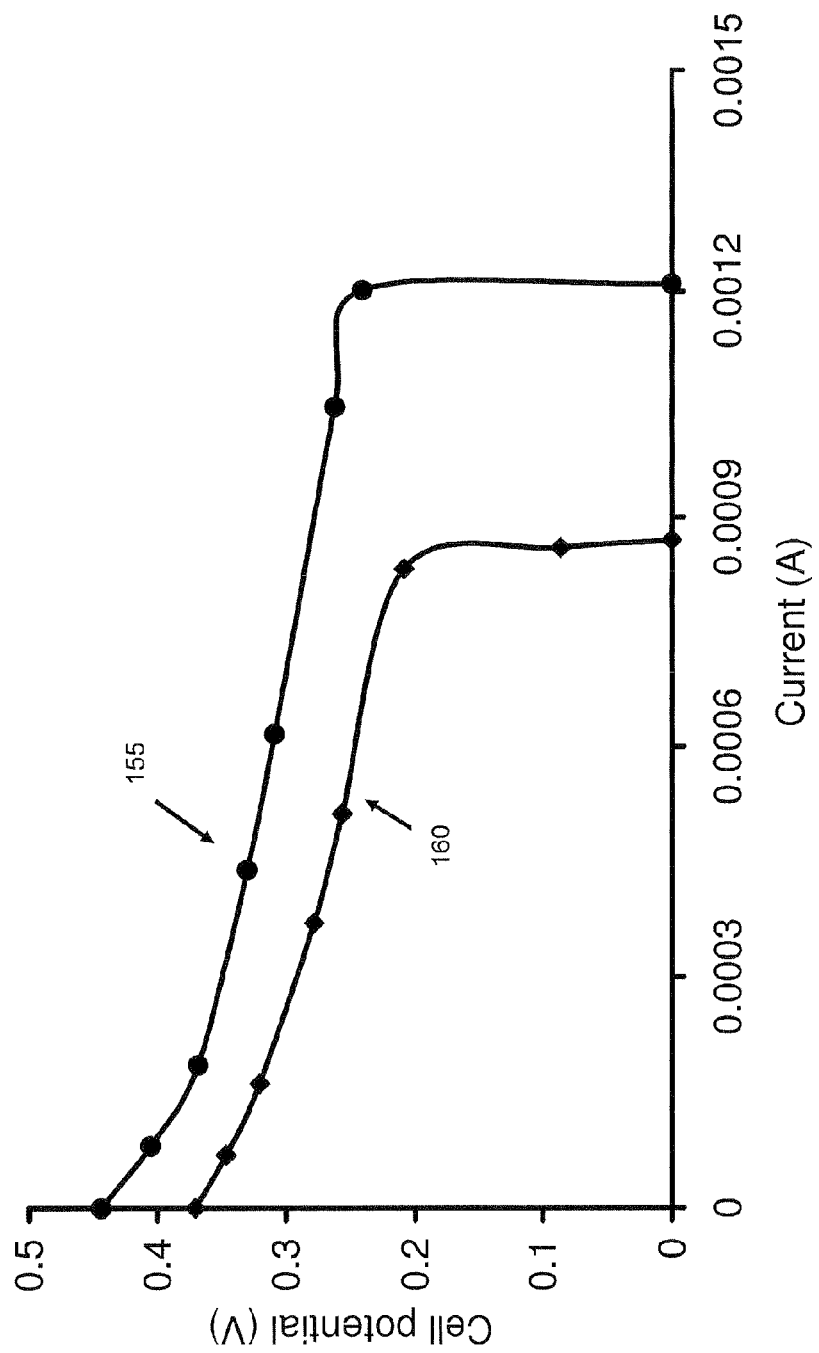
FIG. 4 is a graphical representation of the performance of a microbial fuel cell according to the present invention as compared to the prior art.

These improved results are confirmed by polarization curves obtained at different external resistances by using a resistance box and displayed in FIG. 4 for the new type of cathode 155 and the conventional cathode 160.

The level of teflonization of the carbon cloth can be modified.

The carbon cloth 115 can be replaced by any other type of conductive material, such as but not limited to carbon paper, conductive plastic polymers, steel, graphite granules, graphite fibers, reticulated vitreous carbon, or any non conductive material coated with a conductive paint.

The nature of the BL and GDL may be changed to other materials (e.g. PTFE, Nafion, others).

Additional GDLs can be added on top of the catalyst layer to increase cathode hydrophobicity and prevent leakage. Such GDLs can be made typically but not only of pure PTFE.

The nature and the load of the catalyst on the cathode can be changed (e.g. Pt, Co, Alloys, others).

In further embodiments of the present invention, the cathode 110 may omit the BL 120 and GDL 130 so as to have the catalyst layer 125 applied directly to the carbon cloth 115. A key feature of the present invention is ensuring the catalyst layer is not contaminated by the waste water within the anode chamber and hence, the separation by the BL 120. The omission of a PEM allows higher power output. This is due to reduced internal resistance of the MFC and higher cathode potential. The omission of a PEM adds further advantage through the omission of a construction step and so saving materials and costs.

The embodiment shown in FIG. 2A has further advantage in replacing the platinum catalyst with a cobalt alloy which combined with the less complex construction of the MFC 100 which may provide significant savings in construction costs at little or no sacrifice as compared to more complex and expensive construction. Further, advantages of such an air facing cathode compared to having the catalyst layer facing the waste water, is demonstrated by the performance shown in FIGS. 3 and 4.

The invention claimed is:

1. A microbial fuel cell comprising a cathode and a fuel cell configured with an aperture, the cathode comprising:
   a catalyst layer;
   a backing layer mounted to the aperture; and
   a separation layer situated between the backing layer and the fuel chamber,
   wherein the catalyst layer is mounted to the backing layer on a face opposed to the aperture, so as to be in fluid communication with atmospheric oxygen.

2. The microbial fuel cell according to claim 1, wherein said backing layer is arranged to communicate protons from the chamber to the catalyst layer and to prevent contamination of the catalyst layer by fuel within the chamber.

3. The microbial fuel cell according to claim 1, further comprising an external gas diffusion layer mounted to the catalyst layer on a face in an opposed direction to the aperture.

4. The microbial fuel cell according to claim 1, wherein the backing layer comprises particles of trifluoromethyl sulphonate.

5. The microbial fuel cell according to claim 1, wherein the backing layer comprises PTFE.

6. The microbial fuel cell according to claim 3, wherein the gas diffusion layer comprises PTFE.

7. The microbial fuel cell according to claim 1, wherein the catalyst layer comprises at least one of cobalt, platinum or alloys thereof.

8. The microbial fuel cell according to claim 1, wherein the separation layer is selected from the group consisting of: carbon cloth, carbon paper, a conductive plastic polymer, steel, graphite granules, graphite fibres, reticulated vitreous carbon, and a non-conductive material coated with a conductive paint.

9. A microbial electrolysis cell comprising a cathode and a fuel cell configured with an aperture, the cathode comprising:
a catalyst layer;
a backing layer mounted to the aperture; and
a separation layer situated between the backing layer and the fuel chamber,
wherein the catalyst layer is mounted to the backing layer on a face opposed to the aperture, so as to be in fluid communication with atmospheric oxygen.

10. The microbial electrolysis cell according to claim 9, wherein said backing layer is arranged to communicate protons from the chamber to the catalyst layer and to prevent contamination of the catalyst layer by fuel within the chamber.

11. The microbial electrolysis cell according to claim 9, wherein the separation layer is selected from the group consisting of: carbon cloth, carbon paper, a conductive plastic polymer, steel, graphite granules, graphite fibres, reticulated vitreous carbon, and a non-conductive material coated with a conductive paint.

* * * * *